UNITED STATES PATENT OFFICE.

HAROLD R. MURDOCK, OF NAUGATUCK, CONNECTICUT, ASSIGNOR TO RUBBER REGENERATING COMPANY, A CORPORATION OF INDIANA.

PROCESS OF RECLAIMING RUBBER.

1,257,292.  Specification of Letters Patent.  Patented Feb. 19, 1918.

No Drawing.  Application filed October 8, 1915. Serial No. 54,901.

*To all whom it may concern:*

Be it known that I, HAROLD R. MURDOCK, a citizen of the United States, residing at Naugatuck, county of New Haven, and State of Connecticut, have invented certain new and useful Improvements in Processes of Reclaiming Rubber, of which the following is a full, clear, and exact description.

My invention relates to the recovery of rubber waste, particularly that in which fibrous material has been incorporated, such as rubber resulting from the manufacture of rubber shoes, clothing, hose, automobile tires, or any other rubber scrap containing fiber.

The object of my invention is to efficiently employ certain organic materials for the purpose of disintegrating the fiber, to utilize the cellulose and the rubber of the waste, and to convert the foreign materials into a substance which will serve as an efficient filler for the reclaimed rubber products. A further object of my invention is to eliminate the use of chemicals which have a deleterious action on the rubber itself, such as where strong acids are used.

In the practice of my invention, I prefer to proceed as follows, although I desire to be understood as not being limited to the precise details of the process herein set forth.

The rubber waste or scrap containing cotton fibers is reduced to a comminuted state, then the mass, without separation of the cellulose from the rubber, is thoroughly mixed with a substance which consists essentially of one or more of those organic materials which are capable of undergoing hydrolysis, or those carbohydrates which are capable of decomposition and produce organic acids under the conditions present during the process of devulcanization. In this form of my invention I prefer to use members of the carbohydrate family, such as starch, sugars, etc., since, as I have discovered, these substances decompose during devulcanization, forming organic acids and other substances which are able to effect the destruction of the cellulose. After the scrap material has been thoroughly mixed with the starch or similar substance and with a suitable amount of water, the mass is then placed in a devulcanizer and treated with steam under a pressure of, preferably, about 135 lbs. and for a period of about twenty hours. The time that this treatment should be continued varies with different stocks; but I have found that twenty hours gives good results in reclaiming rubber stock obtained from automobile tires. This treatment alters the cellulose fiber of the rubber waste, converting it into a brittle dark brown substance which is easily pulverized by the slightest mechanical kneading or pressure. The added ingredient also undergoes a similar decomposition, and at the same time I find that the rubber itself is materially softened and improved so that it may be worked to advantage in subsequent steps in utilizing the same. After devulcanization, the stock may then be washed, if desired, or if that is not necessary, it is dried to remove any excess moisture present therein. The product is then worked or mixed so that it is homogeneous and is then in a condition to be utilized as reclaimed rubber.

I have found that the materials specified, for example, starch and sugars, become hydrolyzed to one or more of the saccharoses and that these products by decomposition yield organic acids.

Instead of using the substances named in substantially pure condition, I may use any or all of the products or materials from which they may be derived. I have found that grains, sugar, dextrin, starches, vegetable gums, and other similar raw materials, or any non-fibrous organic by-products obtained from any of the industries in which they are employed, will serve equally as well. All of these substances contain or consist of substantial parts of a carbohydrate or a material which forms organic acids under the conditions of devulcanization, or materials which contain ingredients which undergo hydrolysis, either individually or collectively, or partly or entirely.

This improved method of treating rubber has many advantages over the present methods used, among which is the fact that both the cellulose and the materials added are changed to substances which serve as an efficient filling material and thereby avoids those steps for the removal of the fiber and foreign materials by washing, or by any other of the present well known methods. It may be successfully used in place of the present well known sulfuric acid process for reclaiming, since, besides the previously mentioned advantages, this process avoids a chemical reaction of the mineral filler with the fiber-destroying agent, a reaction which almost invariably occurs by the sulfuric acid process and which is not at all beneficial to the finished stock.

In practice I find it necessary to use the added materials, such as starch, sugar, etc., in amount depending wholly upon the amount of fiber present, and therefore do not wish to be limited to any specific proportion. In general, when reclaiming rubber, I find it sufficient to use the substances in amounts of about twenty per cent. of the weight of rubber waste, but the amount may be increased to one hundred per cent. or more, without any serious detrimental results. If a water-soluble carbohydrate, such as one of the sugars, is used, I find that less than 20% may be used advantageously.

What I claim and desire to protect by Letters Patent is:

1. In a process involving the disintegration of fibrous cellular material, treating the same with a carbohydrate having a non-fibrous structure and capable of hydrolysis under the conditions of devulcanization, the resulting products of which decompose the fiber of said material into an easily pulverizable brittle substance.

2. In a process involving the disintegration of fibrous cellular material, treating the same with a carbohydrate other than cellulose, whose hydrolytic products decompose the fiber of said material under the conditions of devulcanization into an easily pulverizable brittle substance.

3. In a process involving the disintegration of fibrous cellular material, treating the same with a carbohydrate other than cellulose containing disaccharoses and polysaccharoses until the fiber of the material is decomposed into an easily pulverizable brittle substance.

4. In a process involving the disintegration of fibrous cellular material, treating the same with an organic product containing carbohydrate such as sugars until the fiber of the material is decomposed into an easily pulverizable brittle substance.

5. In a process involving the disintegration of fibrous cellular material, treating the same with a vegetable product containing sugars and starch until the fiber of the material is decomposed into an easily pulverizable brittle substance.

6. In the process of reclaiming rubber waste, the step of treating such waste with carbohydrates which under the condition of devulcanizing, causes disintegration of fibrous material in said waste.

7. In the process of reclaiming rubber waste, the step of treating such waste with carbohydrates, which hydrolyze under the conditions of devulcanization and decompose the fibrous material.

8. In the process of reclaiming rubber waste, the step of treating such waste with carbohydrates capable of producing saccharoses, which under the condition of devulcanizing causes decomposition of fibrous material in said waste.

9. In the process of reclaiming rubber waste, the step of treating such waste with carbohydrates containing polysaccharoses other than cellulose which under the condition of devulcanizing causes decomposition of fibrous material in said waste.

10. In the process of reclaiming rubber waste, the step of treating such waste with starchy materials, such as cereal grains, which under the condition of devulcanizing causes decomposition of the fibrous material in said waste.

11. In the process of reclaiming rubber waste, the step of treating such waste with carbohydrates in the form of starch, which under the condition of devulcanizing causes decomposition of fibrous material in said waste.

12. A reclaimed rubber compound containing decomposition products of cellulose and other carbohydrates ground into powder.

13. A reclaimed rubber compound containing hydrolized and decomposed saccharoses and disintegrated cellulose ground into powder.

14. A reclaimed rubber compound containing hydrolized starch of cereal grains and disintegrated cellulose.

15. A reclaimed rubber compound containing hydrolized starch and disintegrated cellulose.

Signed at Naugatuck, Conn., this fourth day of October, 1915.

HAROLD R. MURDOCK.